United States Patent
Krüger

(10) Patent No.: US 11,375,159 B2
(45) Date of Patent: Jun. 28, 2022

(54) VIDEO MANAGEMENT SYSTEM AND METHOD FOR DYNAMIC DISPLAYING OF VIDEO STREAMS

(71) Applicant: Axis AB, Lund (SE)

(72) Inventor: Anders Krüger, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/069,185

(22) Filed: Oct. 13, 2020

(65) Prior Publication Data

US 2021/0176435 A1 Jun. 10, 2021

(30) Foreign Application Priority Data

Dec. 5, 2019 (EP) .................................... 19213926

(51) Int. Cl.
*H04N 7/18* (2006.01)
*G06F 3/0484* (2022.01)
*G06F 3/04845* (2022.01)

(52) U.S. Cl.
CPC ........... *H04N 7/181* (2013.01); *G06F 3/0484* (2013.01); *G06F 3/04845* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 5,917,492 A * | 6/1999 | Bereiter | G06F 3/0489 715/854 |
| 5,956,081 A | 9/1999 | Katz et al. | |
| 7,797,640 B2 | 9/2010 | Baumann | |
| 8,502,868 B2 | 8/2013 | Buehler et al. | |
| 2002/0186300 A1 | 12/2002 | Hudson | |
| 2010/0303436 A1 | 12/2010 | Chang et al. | |
| 2014/0215381 A1 | 7/2014 | Huang et al. | |
| 2014/0229901 A1 * | 8/2014 | Chand | G06F 16/904 715/854 |
| 2014/0325058 A1 * | 10/2014 | Fletcher | H04L 12/4641 709/224 |
| 2016/0283074 A1 | 9/2016 | Drive et al. | |

* cited by examiner

*Primary Examiner* — Mandrita Brahmachari
(74) *Attorney, Agent, or Firm* — Volpe Koenig

(57) ABSTRACT

A video management system for displaying video streams from a plurality of monitoring devices arranged in a network in a video display arrangement. Each monitoring device constitutes a node in the network and has a logical connection to at least one other node. The video management system is configured to: in response to a first input, zoom out from a first subset of views from a first monitoring device or a first group of monitoring devices to a second subset of views, by adding views from a predetermined number of monitoring devices having a direct logical connection to the first monitoring device or the group of monitoring devices, to the video display arrangement, thereby increasing a neighbor monitoring level by one; and in response to a second input, zoom in from the second subset of views thereby decreasing the neighbor monitoring level by one.

12 Claims, 4 Drawing Sheets

VIDEO MANAGEMENT SYSTEM AND METHOD FOR DYNAMIC DISPLAYING OF VIDEO STREAMS

The present disclosure relates to a video management system for displaying video streams from a plurality of monitoring devices in a video display arrangement. The present disclosure further relates to a method for displaying video streams from a plurality of monitoring devices in a video display arrangement.

BACKGROUND

Surveillance devices, including surveillance cameras, are generally used for the purpose of observing one or several areas. A number of surveillance devices may be used in a surveillance system to observe larger areas or areas comprising several sub-areas, for example different rooms in a building. The surveillance devices are often connected to a recording device or IP network and may be controlled by an operator, who can typically also watch video streams from the surveillance devices on a display. In some systems the surveillance cameras can also be controlled by automated software. Surveillance systems are used in, for example, retail stores, hotels, schools, manufacturing industries or in-home security systems.

In a video management system, an operator may view multiple different video streams from different cameras covering multiple monitored areas. To simultaneously display the multiple video streams, several video streams may be displayed on a single monitor by dividing the monitor into a number of smaller windows in a split screen configuration. The same technique may be applied if the operator has, for example, four monitors and needs to observe more than four video streams simultaneously. One or several of the monitors can then be divided into a number of smaller windows.

The operator may have different reasons for changing the partitioning of the monitor. A single camera view on the monitor provides a greater level of detail, whereas multiple video streams displayed on a single monitor simultaneously may provide a better overview of surveilled areas. As an example, on the one hand it is typically easier for the operator to identify or distinguish an object in a given video stream in a single camera view, but on the other hand it is typically easier for the operator to track a target moving between the monitored areas in a configuration where multiple video streams are displayed on a single monitor.

One challenge with the existing video management system is the difficulty of changing accurately between relevant views for an operator. In the existing solutions, in which the operator may select a specific view, it will, however, typically require, or at least be an advantage, that the operator is familiar with the surveilled areas or familiar with the views that can be selected. There is thus a need for a solution that can be more efficiently and more intuitively operated by a user.

SUMMARY

A first aspect of the present disclosure relates to a video management system for displaying video streams from a plurality of monitoring devices arranged in a network in a video display arrangement, wherein each monitoring device constitutes a node in the network and wherein each monitoring device has a logical connection to at least one other node, wherein the video management system is configured to:

in response to a first input, zoom out from a first subset of views from a first monitoring device or a first group of monitoring devices to a second subset of views, by adding views from a predetermined number of monitoring devices having a direct logical connection to the first monitoring device or the first group of monitoring devices, to the video display arrangement, thereby increasing a neighbor monitoring level by one; and in response to a second input, zoom in from the second subset of views, thereby decreasing the neighbor monitoring level by one.

One advantage of the presently disclosed video management system is that it provides an efficient tool for zooming in and out in a logical hierarchy of neighboring monitoring devices. By organizing the monitoring devices in a surveillance system as a network of nodes with logical connections between the nodes and by introducing a neighbor monitoring level, the operator can zoom out from, for example, a first subset of views associated with a first monitoring device to a second subset of views showing views from the first monitoring device and its logical neighbors. A logical neighbor of a first monitoring device may be defined as another monitoring device having a direct logical connection to the first monitoring device according to the network of nodes and logical connections. A 'logical' neighbor according to the present disclosure is not necessarily the physically closest located monitoring device but, preferably, a neighbor which has a physical position in relation to the first monitoring device such that an object moving from an area surveilled by the first monitoring device may enter an area surveilled by the logical neighbor as the next step.

According to one embodiment of the presently disclosed video management system the neighbor monitoring level represents a number of steps between nodes in the network, starting from a main or first monitoring device associated with a main view, wherein video streams from the predetermined number of monitoring devices within said number of steps, starting from the main monitoring device, are displayed in the video display arrangement. This means that an operator can switch between neighbor monitoring levels, corresponding to zooming in and out in the video display arrangement in a predictable manner. As an example, an operator can by means of a key of a keypad or a button of a mouse or other command zoom out from a first subset of views in the form of a single view to the second subset of views. The neighbor monitoring level is thereby increased from 0 to 1. If the operator continues to zoom out to a third subset of views by adding views from the logical neighbors of the monitoring devices associated with the second subset of views, the neighbor monitoring level is further increased to 2.

As demonstrated, the arrangement of monitoring devices in a surveillance system as a network of nodes and logical connections between the nodes, and the introduction of a neighbor monitoring level for zooming purposes, provides a quick and efficient operation tool in a video management system.

The video display arrangement may comprise a dynamic grid. A dynamic grid according to the present disclosure may be construed as a display area which can be used to display one video stream in a full screen configuration or a number of video streams simultaneously by dividing the display area into a number of smaller windows (2×2, 3×3, 4×4, M×N etc.) in a split screen configuration. The dynamic grid is dynamic in the sense that an input can update the configuration, for example as part of a process of zooming in or out. In one embodiment of the presently disclosed video management system, the step of zooming out or in may involve the step of adapting the number of windows displayed in the video display arrangement accordingly.

The present disclosure further relates to a method for displaying video streams from a plurality of monitoring devices arranged in a network in a video display arrangement, wherein each monitoring device constitutes a node in the network and wherein each monitoring device has a logical connection to at least one other node, the method comprising:

- receiving video streams from the plurality of monitoring devices;
- displaying one or several of the video streams in the video display arrangement;
- in response to a first input, zooming out from a first subset of views from a first monitoring device or a first group of monitoring devices to a second subset of views, by adding views from a predetermined number of monitoring devices having a direct logical connection to the first monitoring device or the first group of monitoring devices, to the video display arrangement, thereby increasing a neighbor monitoring level by one; and
- in response to a second input, zooming in from the second subset of views, thereby decreasing the neighbor monitoring level by one.

A person skilled in the art will recognize that the presently disclosed method may be performed using any embodiment of the presently disclosed video management system for displaying video streams from a plurality of monitoring devices arranged in a network in a video display arrangement. Accordingly, the method may perform any step which the presently disclosed video management system is configured to perform.

BRIEF DESCRIPTION OF DRAWINGS

The following teachings will be set forth with reference to the accompanying drawings, which are exemplary and not limiting to the presently disclosed video management system and method.

DETAILED DESCRIPTION

Figure 1:
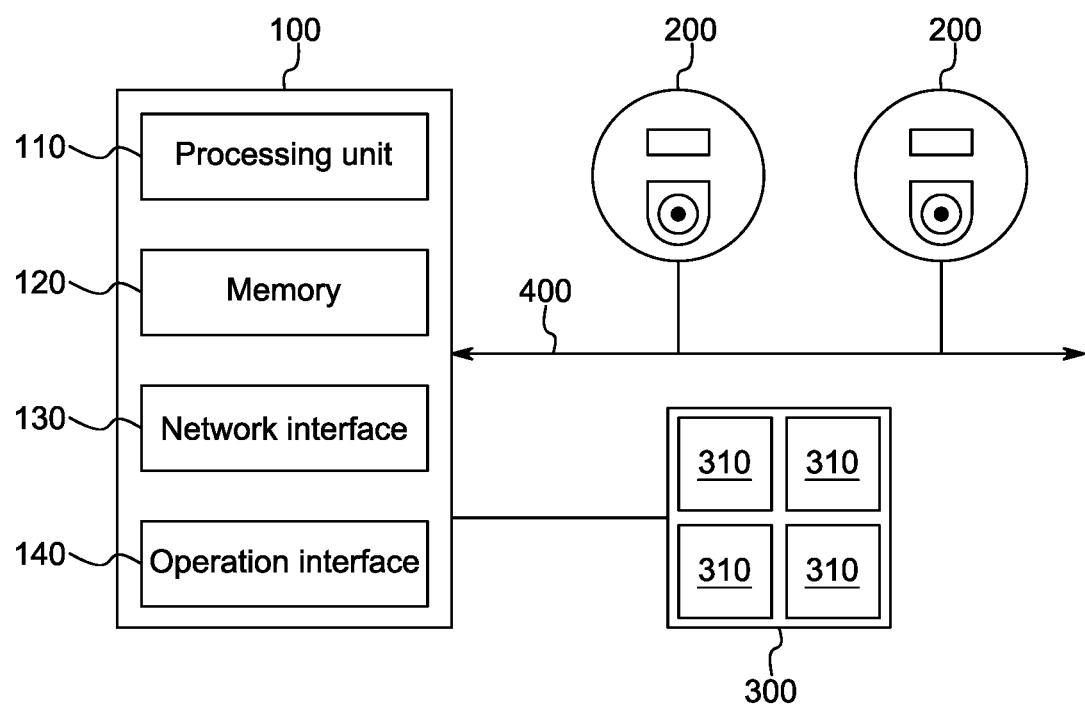
FIG. 1 shows a schematic view of an embodiment of the presently disclosed video management system and a video display arrangement in a surveillance system having a plurality of monitoring devices.

The present disclosure relates to a video management system for displaying video streams from a plurality of monitoring devices arranged in a network in a video display arrangement, wherein each monitoring device constitutes a node in the network and wherein each monitoring device has a logical connection to at least one other node. The video management system may comprise a processing unit configured to in response to a first input, zoom out from a first subset of views from a first monitoring device or a first group of monitoring devices to a second subset of views, by adding views from a predetermined number of monitoring devices having a direct logical connection to the first monitoring device or the first group of monitoring devices, to the video display arrangement, thereby increasing a neighbor monitoring level by one. The first subset of views may be a single view. The processing unit may be further configured to, in response to a second input, zoom in from the second subset of views thereby decreasing the neighbor monitoring level by one.

The video management system may comprise a processing unit, which may be configured to perform any of the tasks described in the present disclosure, preferably by controlling the video display arrangement and the video streams that are displayed in the video display arrangement. The video management system may further comprise a memory, which may be used for storing instructions that can be executed by the processing unit, buffering video streams or other purposes within the functioning of the video management system. The video management system may further comprise a network interface for communication with the monitoring devices and reception of video streams, and an operation interface, which may serve as a communication interface towards the video display arrangement.

In general, a video management system manages the monitoring devices in a surveillance system and the displaying of the video streams received from the monitoring devices. A video management system may further comprise additional functions, including a range of processing tasks related to the video streams, such as filtering, tracking an object etc. Within the scope of the present disclosure, a video management system may be broadly construed as hardware and software for receiving video streams from a plurality of monitoring devices and configuring a video display arrangement to display the video streams in different configurations.

A monitoring device may be, for example, a video camera, such as a surveillance camera, that captures image data using visible light, infrared light, and/or other non-visible electromagnetic radiation (for example a radar for radar imaging). A video stream shall, within the scope of the present disclosure, accordingly be construed not only as series of camera images based on visual light, but also as corresponding series of images from other monitoring devices, such as radar-based monitoring devices. The captured image data may include a continuous image sequence (e.g. video), a limited image sequence, still images, and/or a combination thereof. The monitoring devices may be arranged in a system and connected to the video management system through a communication network, which, for example, may be an internet protocol network and/or a wireless network.

As stated above, by organizing the monitoring devices in a surveillance system as a network of nodes and logical connections between the nodes and by introducing a neighbor monitoring level, the operator can zoom out from a first subset of views associated with a first monitoring device or a first group of monitoring devices to a second subset of views showing views from the first monitoring device and its logical neighbors. A logical neighbor of a first monitoring device may be defined as another monitoring device having a direct logical connection to the first monitoring device according to the network of nodes and logical connections. A logical neighbor according to the present disclosure is therefore not necessarily the physically closest located monitoring device. Preferably, logical neighbors have a physical relation in the sense that they may be arranged such that an object moving from an area surveilled by a first monitoring device will, at some point, enter an area surveilled by a monitoring device that is a logical neighbor to the first monitoring device, preferably, without losing track of the object. As an example, monitoring device (200) corresponding to view B in FIG. 2 has two logical neighbors (views A and C). It can be noted that A is a view in a neighboring room, whereas C is a view of an area in the same room as B, nevertheless a logical neighbor.

Figure 2:
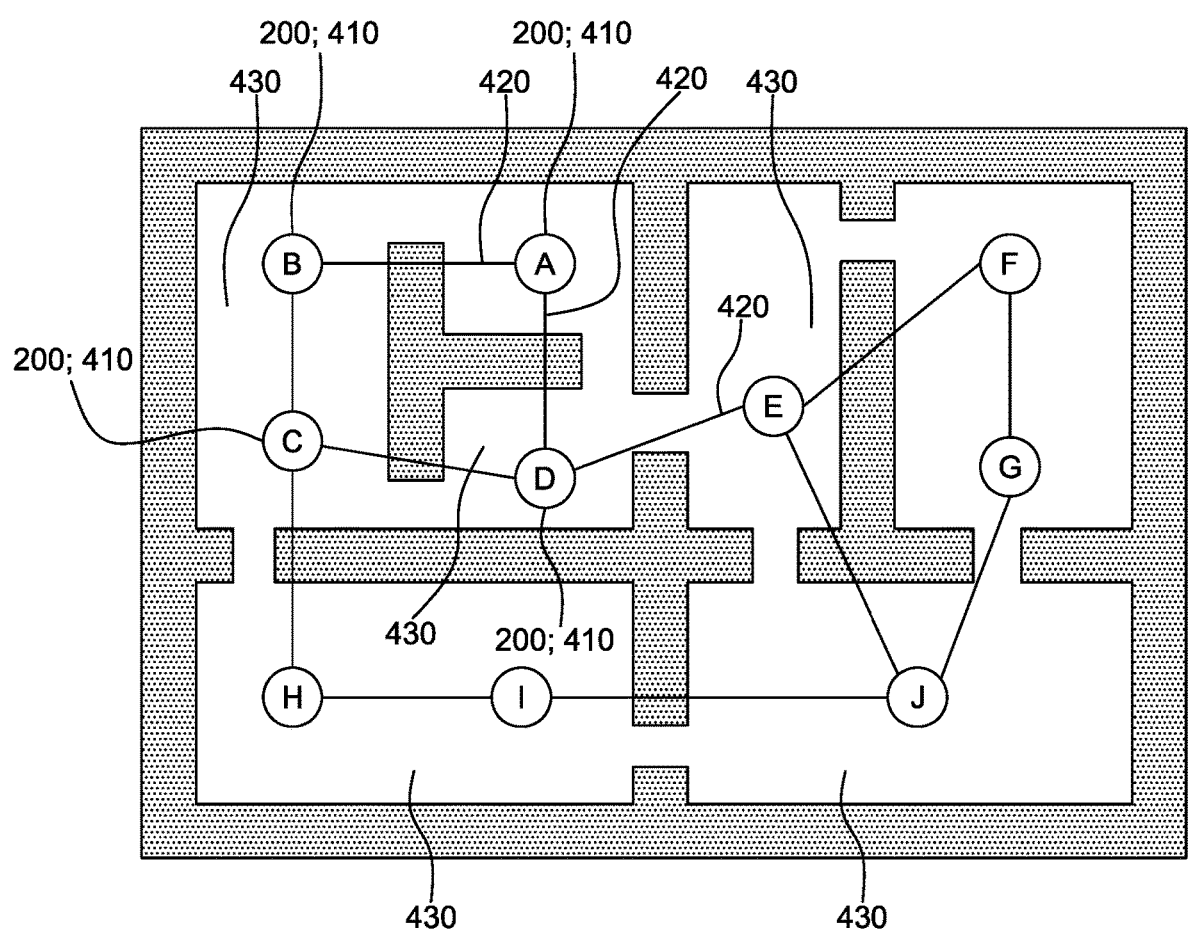
FIG. 2 shows an example of a network of monitoring devices, wherein the monitoring devices constitute nodes in the network and wherein the monitoring devices have logical connections to other monitoring devices.
Figure 3A:
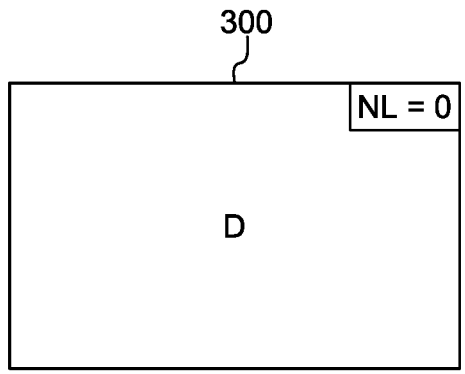
FIGS. 3A-F show a number of exemplary views in a video display arrangement, illustrating a number of possible transitions (3A to 3B, 3B to 3C, 3C to 3D, 3D to 3E, 3E to 3F) between views by zooming and/or changing focus.
Figure 3B:
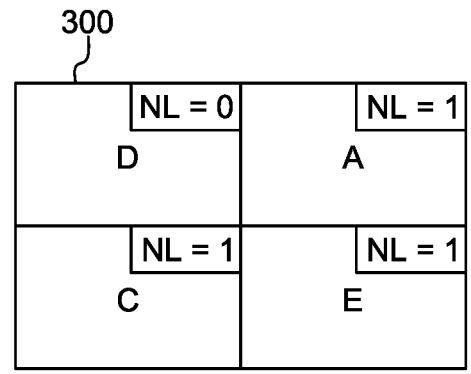
Figure 3C:
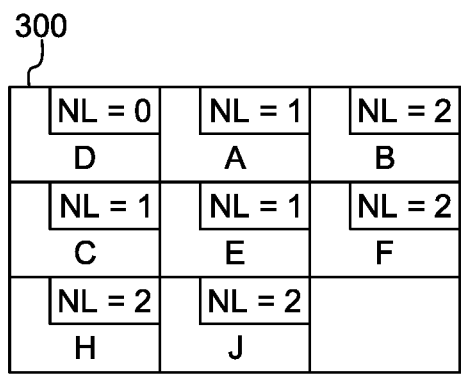

The 'neighbor monitoring level', according to the present disclosure, may represent a number of steps between nodes in the network, starting from a main monitoring device associated with a main view. The main view may, alternatively, be referred to as a reference view. The neighbor monitoring level may thereby be interpreted as the monitoring devices (and associated views) located within the number of steps starting from the main monitoring device. For example, if view D in FIG. 2 is the main view, and the neighbor monitoring level is '1', views C, A and E are accordingly displayed with view D in the video display arrangement, as demonstrated in FIG. 3B. If the neighbor monitoring level is increased to '2', which corresponds to a zoom out operation, the views that can be reached in two steps, starting from D, are displayed in the video display arrangement. In the example this means that views D (neighbor level 0), C, A, E (neighbor level 1), B, H, F, J (neighbor level 2) are displayed, which is shown in FIG. 3C. Thus, the transition from FIG. 3B to FIG. 3C corresponds to the step of zooming out one neighbor level (neighbor monitoring level increases from '1' to '2'). The transition from FIG. 3A to FIG. 3B shows another example of a zoom out wherein the neighbor monitoring level is increased from '0' (single view D) to '1' (views D, A, C and E).

The video management system may be further configured to, in response to a third input, zoom out from the second subset of views to a third subset of views by adding views from a predetermined number of monitoring devices having a logical connection in one or two steps to the first monitoring device or the first group of monitoring devices to the video display arrangement, thereby increasing the neighbor monitoring level by one. The third input may be the same as the first input. By repeating the step of zooming out, the system may be configured to display views from monitoring devices having a logical connection in N steps to the first monitoring device or the first group of monitoring devices to the video display arrangement, if the neighbor monitoring level is N.

In a further embodiment the video management may be configured to, in response to a fourth input, zoom out from the first subset of views from the first monitoring device or the first group of monitoring devices to a third subset of views by adding views from a predetermined number of monitoring devices having a logical connection in one or two steps to the first monitoring device or the first group of monitoring devices to the video display arrangement, thereby increasing the neighbor monitoring level by two. Having an input for directly moving from the first subset of views to the third subset of views provides further improved zooming efficiency to an operator of the video management system.

Generally, the inputs referred to in the present disclosure may be user input, such as input from an operator of the video management system and/or surveillance system. The input may be any input from a touch screen, including any suitable gesture, and/or input from a mechanical button, such as a key of a keypad or a button of a mouse. The input may also be a voice input.

In a specific embodiment, the video management system is configured to, in response to the first input, add views from all monitoring devices having a direct logical connection to the first monitoring device or the first group of monitoring devices, i.e. views from all monitoring devices within the neighbor monitoring level. In one embodiment, the concept is further expanded to add views from all monitoring devices having a logical connection in one or two steps to the first monitoring device or the first group of monitoring devices to the video display arrangement, if the neighbor monitoring level is '2'. The concept may be further expanded to add views from all monitoring devices having a logical connection in N steps to the first monitoring device or the first group of monitoring devices to the video display arrangement, if the neighbor monitoring level is N.

The video display arrangement may comprise a dynamic grid. As stated above a dynamic grid according to the present disclosure may be construed as a display area which can be used to display one video stream in a full screen configuration or a number of video streams simultaneously by dividing the display area into a number of smaller windows (2×2, 3×3, 4×4, M×N etc.) in a split screen configuration.

The dynamic grid may be partitioned based on the neighbor monitoring level and/or based on the number of video streams displayed in the video display arrangement. The dynamic grid may, for example, have a number of predetermined configurations, including a single view; a 2×2 view; a 3×3 view; a 4×4 view; or an N×M view, wherein N and M are positive integers. Preferably, each neighbor monitoring level is associated with a configuration of the dynamic grid of the video display arrangement. A neighbor monitoring level of '0', i.e. no logical neighbors displayed, will typically be associated with a single view. A neighbor monitoring level of '1' may be associated with a 2×2 view. A neighbor monitoring level of '2' may be associated with a 3×3 view etc.

Moreover, for a specific neighbor monitoring level and configuration of the dynamic grid, the number of displayed views from the monitoring devices may not exactly match the number of windows in the dynamic grid. For example, in FIG. 3C the neighbor monitoring level is '2' and the dynamic grid configuration is a 3×3 view, i.e. nine windows. Since there are only eight video streams to display one window is empty. According to one embodiment of the presently disclosed video management system, empty windows may be filled with video streams from a neighbor level which is one level higher than the configured neighbor monitoring level. The additional video streams may be added based on a predetermined list of priorities of the monitoring devices or added manually by the operator.

Similarly, if there are more video streams to display than the number of windows in the dynamic grid, the video management system may have to exclude views exceeding the available number of windows. The video streams to be excluded may be decided automatically based on a predetermined list of priorities of the monitoring devices or selected manually by the operator. In one embodiment, the video management system may be configured to automatically adjust the number of windows in the dynamic grid, i.e. by selecting a configuration, such that there are enough windows to display the monitoring devices covered by the configured neighbor monitoring level.

A further aspect of the presently disclosed video management system relates to the internal arrangement of video streams in the video display arrangement once the neighbor monitoring level, i.e. zooming level, has been set. In one embodiment the main view is arranged in a corner of the video display arrangement. Other views may then be arranged in the video display arrangement according to their distance in number of steps from the main view. An example is provided in FIG. 3C, wherein view D (neighbor level '0') is arranged in the upper left corner. Views from the first neighbor level ('1') are arranged as close as possible to the main view in the video display arrangement. The views from the second neighbor level ('2') are arranged as close as possible to the main view in the video display arrangement after the views from the first neighbor level have been arranged.

According to one embodiment of the presently disclosed video management system, the system is configured to, in response to the second input, zoom in from the second subset of views to the first subset of views. In this embodiment the video management system can thereby zoom out from the first subset of views to the second subset of views using the first input and then back to the first subset of views, i.e. the original subset of views, using the second input. Alternatively, the video management system may be configured to, in response to the second input, zoom in from the second subset of views to a main view selected by a user. The transition from FIG. 3C to FIG. 3D demonstrates zooming in from one subset of views (D, A, C, E, B, F, H, J) to another subset of views (F, G, E) by selection of view F as the main view and decreasing the neighbor monitoring level by one.

The video management may be further configured to, in response to a fifth input, zoom in from the second subset of views and decrease the neighbor monitoring level by two, preferably wherein the main view is selected by a user. The concept may be further expanded to zoom in N number of steps, which may be achieved by an input, such as a key of a keypad or a button of a mouse in combination with an input providing the number of steps to zoom in.

The video management may be further configured to perform special operations based on further inputs. In one embodiment, the video management system is configured to, in response to a sixth input, switch the main view according to a selection by a user; maintain the neighbor monitoring level; and update the video display arrangement by determining and including video streams from the predetermined number of monitoring devices within the neighbor monitoring level. The transition from FIG. 3D to FIG. 3E demonstrates the process of switching main view from view F to view G while maintaining the neighbor monitoring level. The neighbors (F, J) of the main view (G) are thereby displayed in the video display arrangement.

In one embodiment the video management system is further configured to, in response to a seventh input, configure the video display arrangement to display a single view.

In one embodiment the video management system is further configured to, based on an eighth user input, change the neighbor monitoring level to any positive integer provided by a user, thereby causing the video management system to zoom in or zoom out a corresponding number of levels.

As would be recognized by a person skilled in the art, any of the first input, and/or second input, and/or third input and/or fourth input, and/or fifth input, and/or sixth input, and/or seventh input and/or eighth input may be an input from any one of a touch screen, mechanical button, such as a key of a keypad or a button of a mouse, voice input or other input that is suitable for the purpose. The input(s) may be user input(s). Moreover, the first input, and/or second input, and/or third input and/or fourth input, and/or fifth input, and/or sixth input, and/or seventh input may be input based on an event in an area being surveilled by the plurality of monitoring devices.

The present disclosure further relates to a method for displaying video streams from a plurality of monitoring devices arranged in a network in a video display arrangement, wherein each monitoring device constitutes a node in the network and wherein each monitoring device has a logical connection to at least one other node. The method comprises the steps of:
  receiving video streams from the plurality of monitoring devices;
  displaying one or several of the video streams in the video display arrangement;
  in response to a first input, zooming out from a first subset of views from a first monitoring device or a first group of monitoring devices to a second subset of views, by adding views from a predetermined number of monitoring devices having a direct logical connection to the first monitoring device or the first group of monitoring devices, to the video display arrangement, thereby increasing a neighbor monitoring level by one. The method may further comprise the step of, in response to a second input, zooming in from the second subset of views, thereby decreasing the neighbor monitoring level by one.

A person skilled in the art will recognize that the method may be performed using any embodiment of the presently disclosed video management system for displaying video streams from a plurality of monitoring devices arranged in a network in a video display arrangement. Accordingly, the method may perform any step which the presently disclosed video management system is configured to perform.

The invention further relates to a computer program having instructions which when executed by a computing device or computing system cause the computing device or system to carry out any embodiment of the presently disclosed method for monitoring video streams in a video display arrangement. Computer program in this context shall be construed broadly and include, for example, programs to be run on a PC or software adapted to run as a part of a surveillance system or as part of a video management system. The computer program may be part of a video management software.

DETAILED DESCRIPTION OF DRAWINGS

The following described in greater detail will be made with reference to the accompanying drawings. The drawings are exemplary and are intended to illustrate some of the features of the presently disclosed video management system and method for displaying video streams, and are not to be construed as limiting to the presently disclosed invention.

FIG. 1 shows a schematic view of an embodiment of the presently disclosed video management system (100) and a video display arrangement (300) in a surveillance system having a plurality of monitoring devices (200). The monitoring devices (200) are connected to the video management system (100) through a communication network (400), which may be, for example, an internet protocol network (400) and/or a wireless network (400). The video display arrangement (300) comprises a display area which is divided into a number of smaller windows (310). The video management system (100) comprises a processing unit (110), which may be configured to perform any of the zooming task described in the present disclosure, preferably by controlling a configuration of the video display arrangement (300) and the video streams that are displayed in the video display arrangement (300). The video management system (100) further comprises a memory (120), which may be used for storing instructions that can be executed by the processing unit (110), buffering video streams or other purposes within the functioning of the video management system (100). The video management system (100) further comprises a network interface (130) for communication with the monitoring devices (200) and reception of video streams and an operation interface (140), which may serve as a communication interface towards the video display arrangement (300).

FIG. 2 shows an example of a network of monitoring devices (200), wherein the monitoring devices (200) constitute nodes (410) in the network and wherein the monitoring devices (200) have logical connections (420) to other monitoring devices (200). FIG. 2 illustrates a layout of a building, which is divided into rooms or spaces (430). The letters A-J denote views. Each view is associated with a monitoring device (200) and a node (410).

Figure 3D:
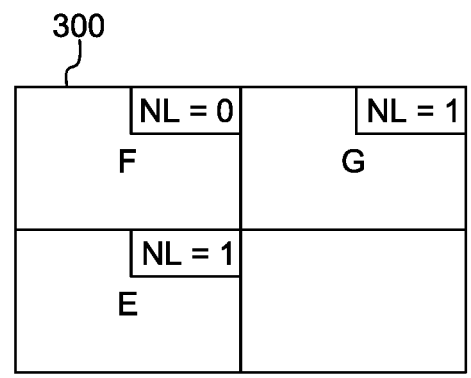
Figure 3E:
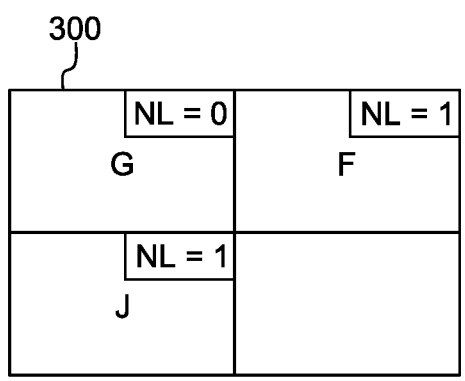
Figure 3F:
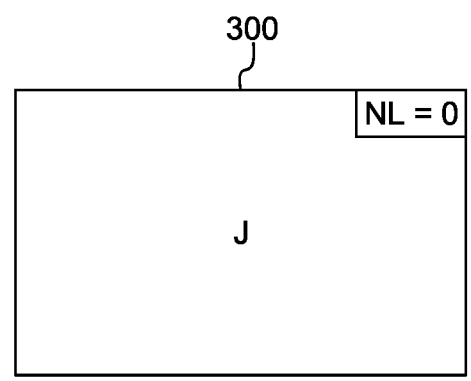

FIGS. 3A-F show a number of exemplary views (A/B/C/D/E/F/G/H/J) in a video display arrangement (300), illustrating a number of possible transitions (3A to 3B, 3B to 3C, 3C to 3D, 3D to 3E, 3E to 3F) between views by zooming and/or changing focus of operator interest. For each view a neighbor level (NL) is indicated. NL=0 indicates that the view is the main view. NL=1 indicates that the view is associated with a monitoring device having a direct logical connection to the monitoring device associated with the main view, and so forth. The transition from FIG. 3A to FIG. 3B illustrates zooming out one neighbor level from view D, i.e. zooming out from a first subset of views (D) to a second subset of views (D, A, C, E). The transition from FIG. 3B to FIG. 3C illustrates zooming out one neighbor level, i.e. zooming out from the second subset of views (D, A, C, E) to a third subset of views (D, A, C, E, B, F, H, J). The transition from FIG. 3C to FIG. 3D illustrates zooming in from the third subset of views (D, A, C, E, B, F, H, J) by selection of view F as the main view and decreasing the neighbor monitoring level by one. The transition from FIG. 3D to FIG. 3E illustrates switching main view from view F to view G while maintaining the neighbor monitoring level. The neighbors (F, J) of the main view (G) are thereby displayed in the video display arrangement (300). The transition from FIG. 3E to FIG. 3F illustrates zooming in from the subset of views of FIG. 3E (G, F, J) by selection of view J as the main view and decreasing the neighbor monitoring level by one.

Figure 4:
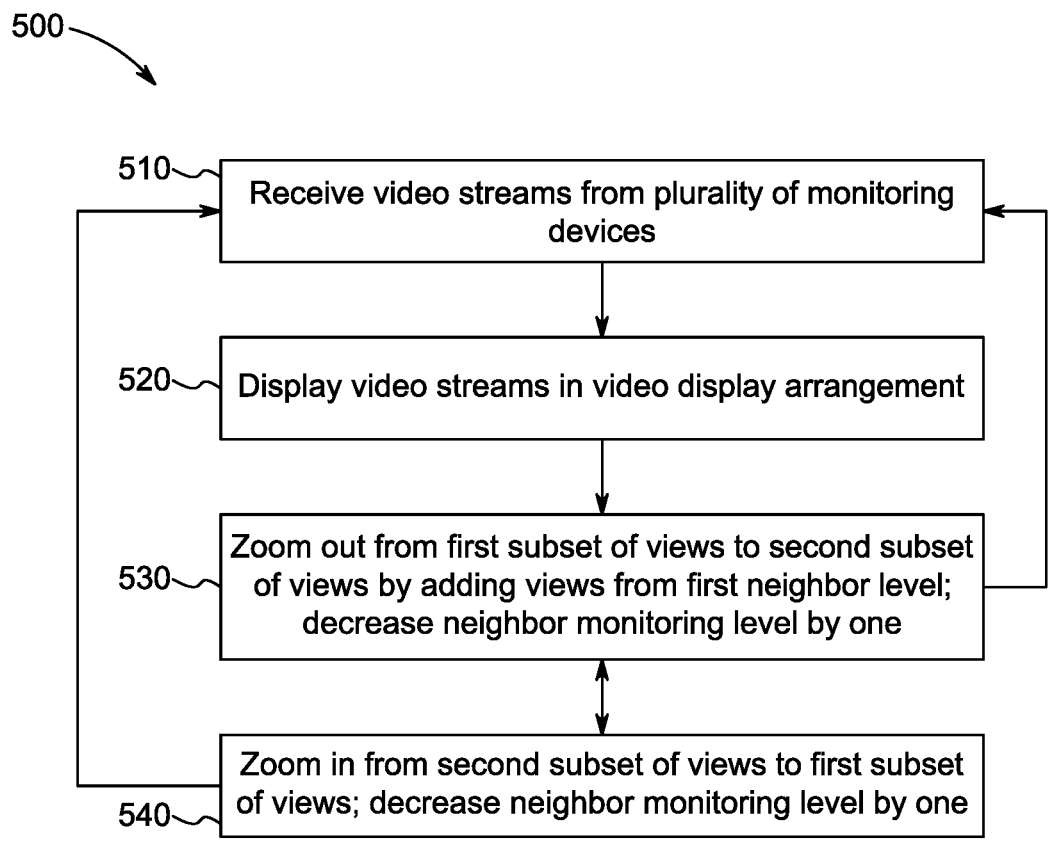
FIG. 4 shows a flow chart of a method according to embodiments of the presently disclosed method for displaying video streams.

FIG. 4 shows a flow chart of a method according to embodiments of the presently disclosed method for displaying video streams (500). The method comprises the steps of: receiving video streams from the plurality of monitoring devices (510); displaying one or several of the video streams in the video display arrangement (520); in response to a first input, zooming out from a first subset of views from a first monitoring device or a first group of monitoring devices to a second subset of views, by adding views from a predetermined number of monitoring devices having a direct logical connection to the first monitoring device or the first group of monitoring devices, to the video display arrangement, thereby increasing a neighbor monitoring level by one (530); and in response to a second input, zooming in from the second subset of views, thereby decreasing the neighbor monitoring level by one (540).

The invention claimed is:

1. A video management system, comprising a processing unit, for displaying video streams from a plurality of monitoring devices arranged in a network in a video display arrangement, wherein each monitoring device constitutes a node in the network and wherein each monitoring device has a logical connection to at least one other node,
   wherein a logical neighbor of a first monitoring device is defined as another monitoring device having a direct logical connection to the first monitoring device wherein logical neighbors are arranged such that an object moving from an area surveilled by the first monitoring device may enter an area surveilled by the logical neighbor,
   wherein a neighbor monitoring level represents the number of steps between the nodes in the network,
   wherein the processing unit of the video management system is configured to:
   in response to a first input, zoom out from a first subset of views from a first monitoring device or a first group of monitoring devices to a second subset of views, by adding, while keeping the first subset of views, views from a predetermined number of monitoring devices having a direct logical connection to the first monitoring device or the first group of monitoring devices, the added monitoring devices being the logical neighbors of the monitoring devices associated with the first subset of view, to the video display arrangement, thereby increasing a neighbor monitoring level by one;
   in response to a second input, zoom in from the second subset of views, thereby decreasing the neighbor monitoring level by one;
   in response to a third input, starting from a configuration wherein the video management system is configured to display video streams from the monitoring devices associated with the second subset of views, zoom out from the second subset of views to a third subset of views by adding, while keeping the second subset of views, views from a predetermined number of monitoring devices having a logical connection in one or two steps to the first monitoring device or the first group of monitoring devices, the added monitoring devices being the logical neighbors of the monitoring devices associated with the second subset of views, to the video display arrangement, thereby increasing the neighbor monitoring level by one; and
   based on a user input, change the neighbor monitoring level to any positive integer provided by a user, thereby causing the video management system to zoom in or zoom out a corresponding number of levels.

2. The processing unit of the video management system according to claim 1, further configured to,
   in response to the first input, add views from all monitoring devices having a direct logical connection to the first monitoring device or the first group of monitoring devices.

3. The video management system according to claim 1, wherein the video display arrangement comprises a dynamic grid, wherein the dynamic grid is partitioned based on the neighbor monitoring level and/or based on the number of video streams displayed in the video display arrangement.

4. The video management system according to claim 3, wherein the dynamic grid is configured to display a single view; a 2×2 view; a 3×3 view; a 4×4 view; or an N×M view, wherein N and M are positive integers.

5. The processing unit of the video management system according to claim 4, further configured to,
  in response to a fourth input, zoom out from the first subset of views from the first monitoring device or the first group of monitoring devices to a third subset of views by adding, while keeping the first subset of views, views from a predetermined number of monitoring devices having a logical connection in one or two steps to the first monitoring device or the first group of monitoring devices to the video display arrangement, thereby increasing the neighbor monitoring level by two.

6. The processing unit of the video management system according to claim 1, further configured to,
  in response to the second input, zoom in from the second subset of views to the first subset of views.

7. The processing unit of the video management system according claim 1, further configured to,
  in response to the second input, zoom in from the second subset of views to the main view selected by a user and decrease the neighbor monitoring level by one.

8. The processing unit of the video management system according to claim 1, further configured to,
  in response to a fifth input, zoom in from the second subset of views and decrease the neighbor monitoring level by two.

9. The processing unit of the video management system according to claim 1, further configured to,
  in response to a sixth input, switch the main view according to a selection by a user; maintain the neighbor monitoring level; and update the video display arrangement by determining and including video streams from the predetermined number of monitoring devices within the neighbor monitoring level.

10. The processing unit of the video management system according to claim 1, further configured to
  arrange the main view in a corner of the video display arrangement, wherein other views are arranged in the video display arrangement according to their distance in number of steps from the main view.

11. A method for displaying video streams from a plurality of monitoring devices arranged in a network in a video display arrangement, wherein each monitoring device constitutes a node in the network and wherein each monitoring device has a logical connection to at least one other node,
  wherein a logical neighbor of a first monitoring device is defined as another monitoring device having a direct logical connection to the first monitoring device, wherein logical neighbors are arranged such that an object moving from an area surveilled by the first monitoring device may enter an area surveilled by the logical neighbor, wherein a neighbor monitoring level represents the number of steps between the nodes in the network, the method comprising:
  receiving video streams from the plurality of monitoring devices;
  displaying one or several of the video streams in the video display arrangement;
  in response to a first input, zooming out from a first subset of views from a first monitoring device or a first group of monitoring devices to a second subset of views, by adding, while keeping the first subset of views, views from a predetermined number of monitoring devices having a direct logical connection to the first monitoring device or the first group of monitoring devices, the added monitoring devices being the logical neighbors of the monitoring devices associated with the first subset of views, to the video display arrangement, thereby increasing a neighbor monitoring level by one;
  in response to a second input, zooming in from the second subset of views, thereby decreasing the neighbor monitoring level by one;
  in response to a third input, starting from a configuration wherein the video management system is configured to display video streams from the monitoring devices associated with the second subset of views, zoom out from the second subset of views to a third subset of views by adding, while keeping the second subset of views, views from a predetermined number of monitoring devices having a logical connection in one or two steps to the first monitoring device or the first group of monitoring devices, the added monitoring devices being the logical neighbors of the monitoring devices associated with the second subset of views, to the video display arrangement, thereby increasing the neighbor monitoring level by one; and
  based on a user input, change the neighbor monitoring level to any positive integer provided by a user, thereby causing the video management system to zoom in or zoom out a corresponding number of levels.

12. A non-transitory computer-readable medium comprising instructions which, when executed by a computing device or computing system, cause the computing device or computing system to carry out the method for monitoring video streams in a video display arrangement according to claim 11.

\* \* \* \* \*